(12) United States Patent
Rubinstein Apozdava

(10) Patent No.: US 10,410,166 B2
(45) Date of Patent: Sep. 10, 2019

(54) SYSTEM AND METHOD FOR PROCESSING PACKAGES FOR SHIPPING

(71) Applicant: The Perfect Shipping LLC, North Miami Beach, FL (US)

(72) Inventor: Jaime Luis Rubinstein Apozdava, Miami, FL (US)

(*) Notice: Subject to any disclaimer, the term of this patent is extended or adjusted under 35 U.S.C. 154(b) by 0 days.

(21) Appl. No.: 15/852,033

(22) Filed: Dec. 22, 2017

(65) Prior Publication Data

US 2018/0121865 A1 May 3, 2018

Related U.S. Application Data

(60) Provisional application No. 62/411,915, filed on Oct. 24, 2016.

(51) Int. Cl.
| | |
|---|---|
| *G06Q 90/00* | (2006.01) |
| *G06Q 10/08* | (2012.01) |
| *G06Q 30/02* | (2012.01) |
| *G06K 7/10* | (2006.01) |
| *G01G 19/00* | (2006.01) |
| *G01B 11/02* | (2006.01) |
| *G06K 19/06* | (2006.01) |
| *G06F 16/903* | (2019.01) |

(52) U.S. Cl.
CPC ......... *G06Q 10/083* (2013.01); *G01B 11/022* (2013.01); *G01G 19/005* (2013.01); *G06K 7/10762* (2013.01); *G06K 7/10861* (2013.01); *G06Q 30/0283* (2013.01); *G06F 16/903* (2019.01); *G06K 19/06112* (2013.01)

(58) Field of Classification Search
USPC .................................. 235/375–385
See application file for complete search history.

(56) References Cited

U.S. PATENT DOCUMENTS 7,552,860 B2* 6/2009 Tani ...................... G06Q 10/10
235/375

* cited by examiner

*Primary Examiner* — Jamara A Franklin
(74) *Attorney, Agent, or Firm* — Johnson & Martin, P.A.; James David Johnson

(57) ABSTRACT

Systems, software, and methods for processing a package for shipping to a recipient are described. The system includes a user device and a package intake device. The user device includes software that allows a user to connect with other users to make the user's address available to the other users including any updates due to moves or travel. The user device also features a transmission device for transmitting recipient information of a recipient selected from a list of recipients displayed on the user device. The package intake device includes a computer, a receiving device for receiving the recipient information transmitted by the user device, and a package recognition device for analyzing the package to determine one or more package criteria. The package intake device determines a type for the package and an identity of a shipper selected to deliver the package based on the one or more package criteria.

20 Claims, 9 Drawing Sheets

Machine  Packing

SYSTEM AND METHOD FOR PROCESSING PACKAGES FOR SHIPPING

CROSS REFERENCE TO RELATED APPLICATIONS

This application is a nonprovisional application of and claims priority from U.S. provisional patent application Ser. No. 62/411,915 filed on Oct. 24, 2016. The foregoing application is incorporated in its entirety herein by reference.

FIELD OF THE INVENTION

The invention relates to systems and methods for processing a package for shipping to a recipient. More specifically, the invention relates to systems, software, and methods for processing a package for shipping to a recipient using (i) a self-service package intake device for determining the type of package being shipped, for measuring the dimensions of a package, and for determining an identity of a shipper selected to deliver the package based on package color or printed matter on the package, and (ii) a user device to transmit recipient information related to the recipient to the package intake device and an associated printer.

BACKGROUND

Retail shipping businesses as well as the postal service have relied upon human workers to assist customers with their shipping needs. Workers at retail shipping stores must ask each customer which shipping company the customer wishes to select for sending a package. Workers have used scales and measurement tapes or rulers to ascertain the dimensions of packages. In some cases, customers may also be provided access to these tools to determine the dimensions (e.g., height, width, length or depth, and weight or mass) of the packages that they wish to ship. Electronic versions of these tools may also be used such as, for example, laser measures and digital scales. However, none of these devices has permitted automated, self-service measurement of packages by customers with the measurement data transmitted to a payment system that calculates the shipping charge and accepts payment from the customer.

Current shipping systems and methods also do not permit customers who wish to ship a package to easily provide a recipient's name, address, and other contact information to the retail shipping store. These current shipping systems and methods also do not permit an automated identification of a package type (e.g., a letter envelope or a box) or an automated identification of a shipper (also referred to herein as a carrier or a courier) that has been selected by a customer to deliver the package to the recipient.

A need exists for systems and methods that allows self-service processing of a package for shipping by a customer including obtaining the package's measurements. A need also exists for systems and methods that allow a customer (i.e., a sender of the package) to easily provide a recipient's name, address, and contact information for printing on a shipping label. A need further exists for systems and methods that are capable of automatically determining the type of package being shipped. Still a further need exists for systems and methods capable of automatically determining an identity of the shipper selected by the customer (or by the customer's agent or employee or by the retail shipping store's employee) to deliver the package to the recipient and for determining a shipping price and processing payment based on the determination of the selected shipper's identity.

SUMMARY

The invention features systems, software, and methods for processing a package for delivery to a recipient by a shipper (also referred to as a courier or a carrier). The system includes a user device and a package intake device. The user device features a transmission device for transmitting recipient information of a recipient selected from a list of recipients displayed on the user device. The user device includes software that allows a user to connect with other users to make the user's address available to the other users including any updates to the user's address due to moves or travel. The package intake device processes a package for shipping and includes a computer, a receiving device for receiving the recipient information transmitted by the user device, and a package recognition device for analyzing the package to determine one or more package criteria. The package intake device determines a type for the package and an identity of a shipper selected to deliver the package based on the one or more package criteria. Recipient information received from the user device is printed on a shipping label by a printer communicatively connected to the computer of the package intake device.

The package intake device can be shaped and sized to allow packages of various sizes and weights to have their dimensions measured. The package intake device can include a weighing device, a measuring device, and at least one camera as well as a computer. The user device (e.g., a mobile phone or tablet computer) can communicatively connect to the computer to permit a user to transmit recipient information for a recipient of the package. The system can also permit the user to make a payment for the shipping price charged for shipping the package.

One advantage of the systems and methods described herein is that they permit a customer to perform the measurements and to make payment for the shipping costs for the customer's package via self-service, thereby reducing the number of workers that a shipping company must employ to assist customers. Another advantage of these systems and methods is that a customer may go to the location of the measurement device to measure the dimensions of a package while another person in a second location can use a mobile device to pay for the shipping costs to ship the package based on dimensions determined by the measurement device.

Still another advantage of the systems and methods described here is that they permit the measurements and recipient information to be easily entered and transmitted to a printer for printing the shipping label. Yet another advantage of these systems and methods is that they can automate the identification of the type of package being shipped as well as the identification of the shipper selected to deliver the package to the recipient. A further related advantage of these systems and methods is that, by automating parts of the package processing process, errors in measurements and pricing as well as in addressing packages for delivery to recipients for delivery by shippers is reduced.

Accordingly, the invention features a system for processing a package for shipping to a recipient. The system includes a mobile computing device that features software for generating a code that encodes recipient information related to a recipient of the package and a display for displaying the code. The system also includes a weighing device for determining a weight or mass of a package, a measuring device for determining linear dimensions of the package, and at least one camera for detecting the code displayed on the display of the mobile computing device. The system further includes at least one computer communicatively connected to the mobile computing device, the weighing device, the measuring device, and the at least one camera. The computer features a decoding application for reading the code detected by the camera and converting the code to printable data. The computer also features a package recognition application for determining a type for the package using data obtained from the weighing device, the measuring device, the camera, or a combination of two or more of the foregoing. The computer further includes a courier recognition application for determining an identity of a shipper for the package using data obtained from the weighing device, the measuring device, the camera, or a combination of two or more of the foregoing.

In another aspect, the invention can feature a server that includes a database for receiving and storing the recipient information for the recipient. The recipient information is transmitted to the server by the mobile computing device via a communications network.

In another aspect, the invention can feature a server that includes a database for receiving and storing the recipient information for the recipient. The recipient information is transmitted to the server by the computer via a communications network.

In another aspect, the invention can feature the at least one computer including a first computer and a server communicatively connected via a communications network.

In another aspect, the invention can feature one or more of the decoding application, the package recognition application, and the courier recognition application being installed on the server.

In another aspect, the invention can feature the at least one camera transmitting image data related to the package to the at least one computer. The courier recognition application of the at least one computer determines the identity of the shipper selected for delivery of the package based on optical recognition of a color, symbol, word, or logo associated with the shipper and which appears on the package.

In another aspect, the invention can feature a printer for printing a shipping label. The printer is communicatively connected to the at least one computer and receives the printable data transmitted to the printer from the at least one computer for printing the printable data on the shipping label.

The invention also features a system for processing a package for shipping to a recipient. The system includes a user device and a package intake device. The user device features a transmission device for transmitting recipient information of a recipient selected from a list of one or more recipients displayed on the user device. The package intake device processes a package for shipping, and includes a computer having a processor and associated memory. The package intake device also includes a receiving device for receiving the recipient information transmitted by the user device and a package recognition device for analyzing the package to determine one or more package criteria.

In another aspect, the invention can feature the user device being a mobile phone, a tablet computer, a personal digital assistant device, a laptop computer, or any other portable computing device.

In another aspect, the invention can feature the user device including a recipient information application for inputting, editing, and viewing the recipient information of the recipient.

In another aspect, the invention can feature the recipient information inputted into the recipient information application being stored on a database. The database can reside on the user device or on a remote server.

In another aspect, the invention can feature the package recognition device including a weighing device for determining a weight or mass of the package.

In another aspect, the invention can feature the package recognition device including a measuring device for determining linear dimensions of the package.

In another aspect, the invention can feature the package recognition device including a camera communicatively connected to the computer. The computer can include an optical courier recognition application for determining an identity of a shipper for the package using data obtained from the camera.

In another aspect, the invention can feature the one or more package criteria being selected from among: a weight of the package, a mass of the package, a height of the package, a width of the package, a length or depth of the package, a shipper selected for delivering the package to the recipient, and a type of the package. The type of the package can be a box, a letter-sized envelope, an envelope larger than letter-sized, a tube, a post card, or another type of shipping package.

In another aspect, the invention can feature a printer for printing a shipping label. The printer is communicatively connected to the package intake device, which transmits the recipient information to the printer for printing on the shipping label.

A method of the invention can be used for processing a package for shipping to a recipient. The method includes the steps of: (a) selecting a recipient to receive delivery of a package, wherein the selection of the recipient is made from a list of one or more recipients displayed on a user device; (b) transmitting recipient information related to the selected recipient from the user device to a package intake device, wherein the package intake device includes a computer featuring a receiving device, wherein the receiving device receives the recipient information transmitted from the user device; (c) analyzing the package to determine one or more package criteria using a package recognition device; (d) associating the package with the recipient information of the selected recipient; and (e) transferring the package to a shipper for delivery to the recipient.

Another method of the invention can include step (d) of the method further including the steps of: (f) communicating the recipient information to a printer connected to the computer via a wired network or a wireless network; and (g) printing a shipping label for the package, wherein the printed shipping label includes the recipient information.

Another method of the invention can include step (c) of the method further including the steps of: (h) transmitting image data related to the package from at least one camera to the computer, wherein the package intake device includes the at least one camera; and (i) determining an identity of a shipper selected for delivery of the package to the recipient based on optical recognition of a color, symbol, word, or logo associated with the shipper and which appears on the package. The computer features a courier recognition application, wherein the optical recognition is performed by the courier recognition application by analyzing the image data of the package to match the color, symbol, word, or logo on the package with a corresponding color, symbol, word, or logo contained in a shipper database.

Another method of the invention can include the steps of: (j) determining a weight or mass of the package using a weighing device, wherein the package intake device includes the weighing device; (k) determining linear dimensions of the package using a measuring device, wherein the package intake device includes the measuring device; (l) determining a type of the package using a package recognition application, wherein the computer includes the package recognition application, and wherein the package recognition application determines the package's type by analyzing package data obtained from the weighing device, the measuring device, the at least one camera, or a combination of two or more of the foregoing; and (m) determining a shipping price based on the package type and the identity of the shipper.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
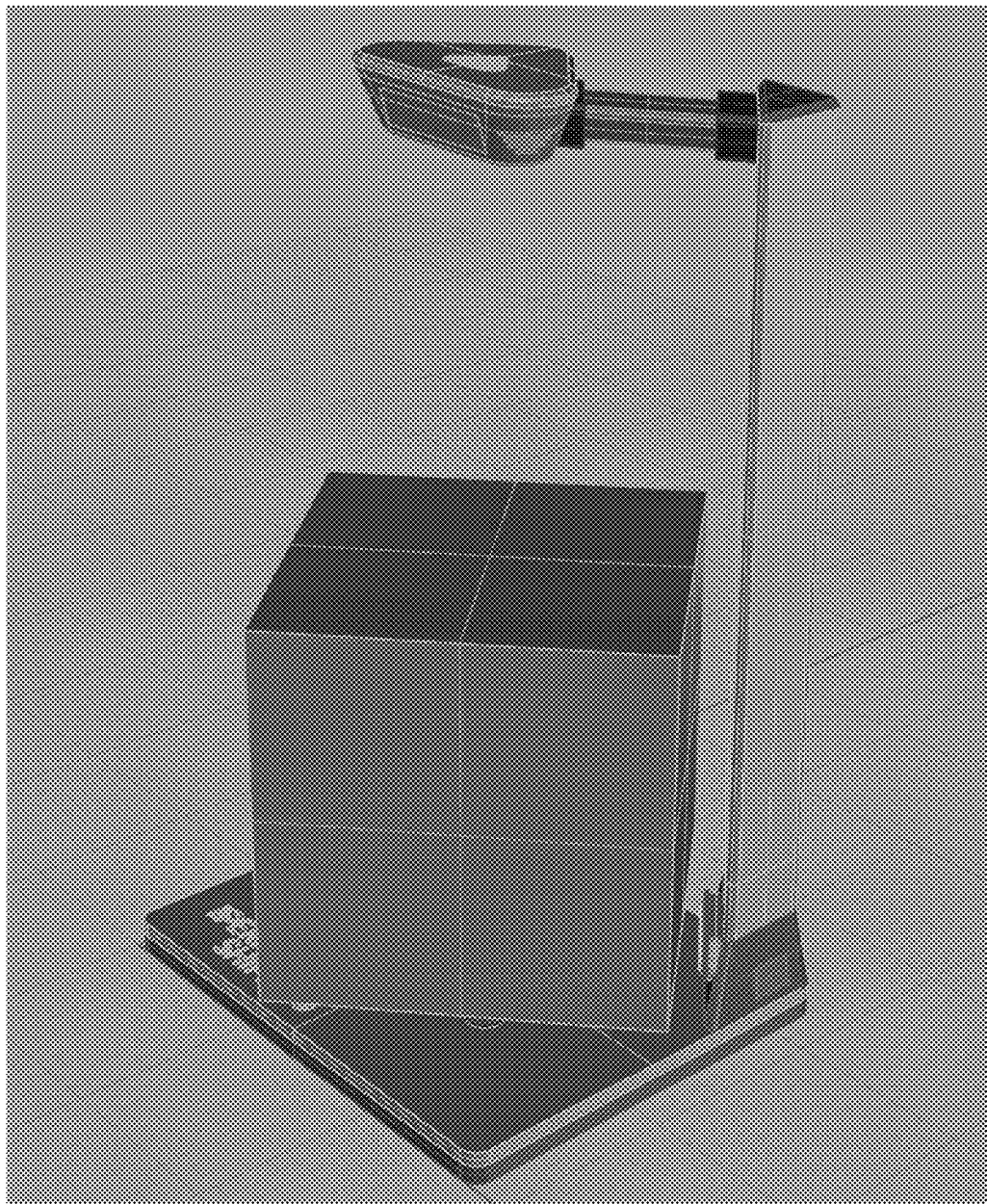
FIG. 1 is a perspective elevation view of a package intake device of a system for processing a package for shipping to a recipient.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Figure 2:
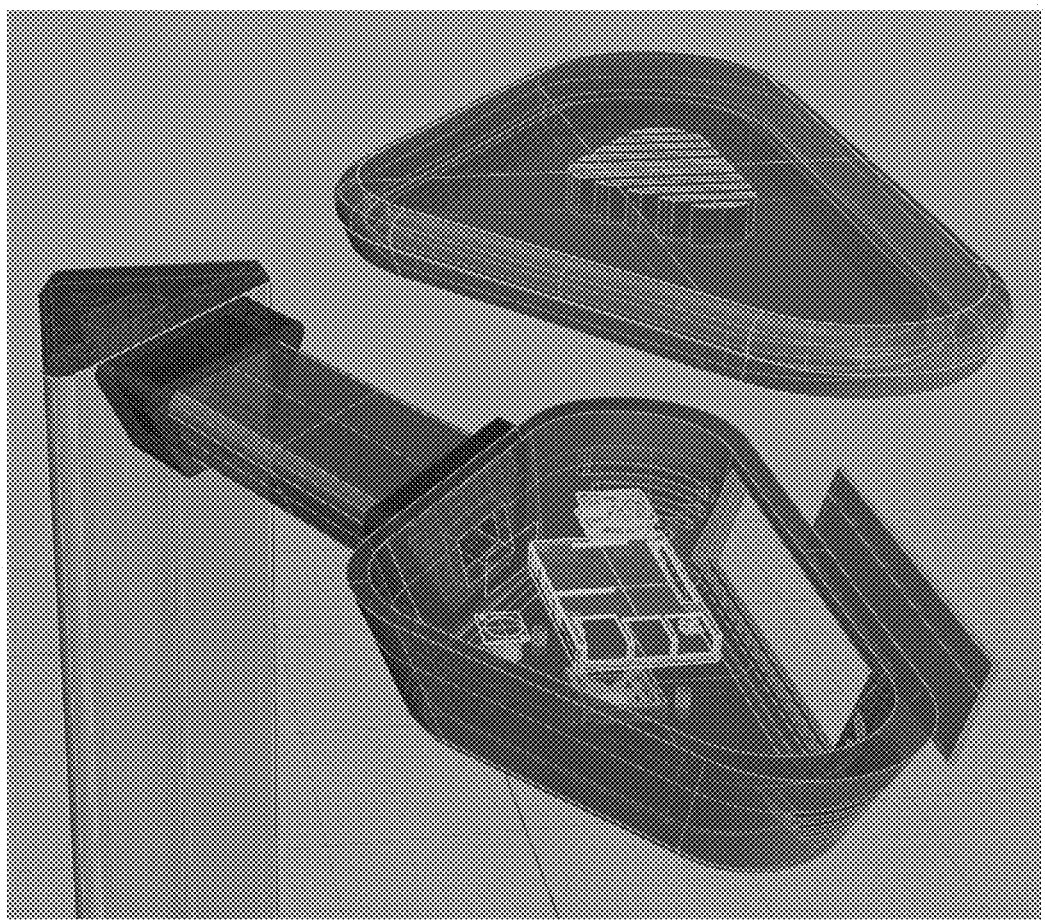
FIG. 2 is an exploded perspective view of a housing of the package intake device of FIG. 1 showing components of the system installed within the housing.
Figure 3:
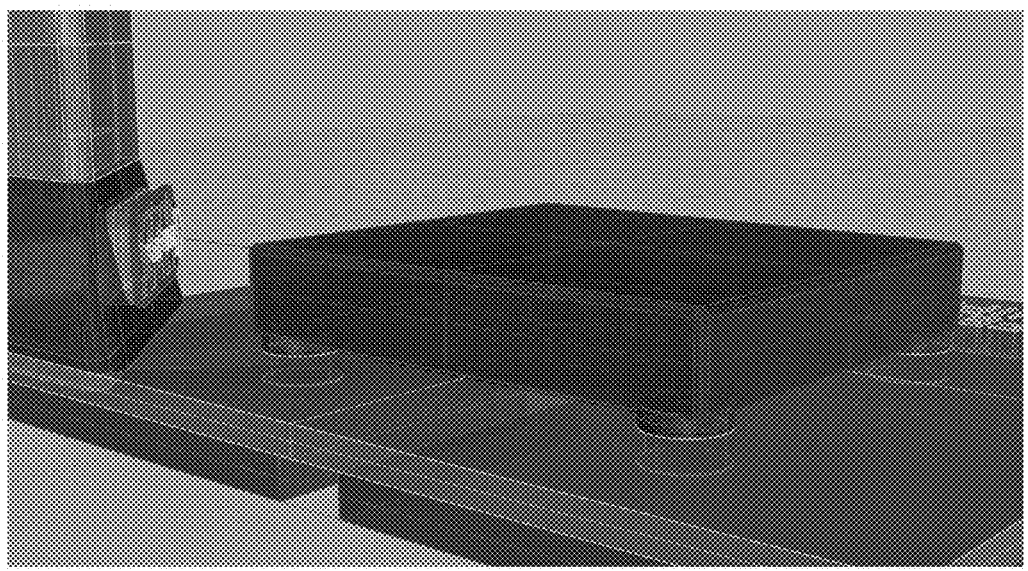
FIG. 3 is a close-up perspective view of a base of the package intake device.
Figure 4A:
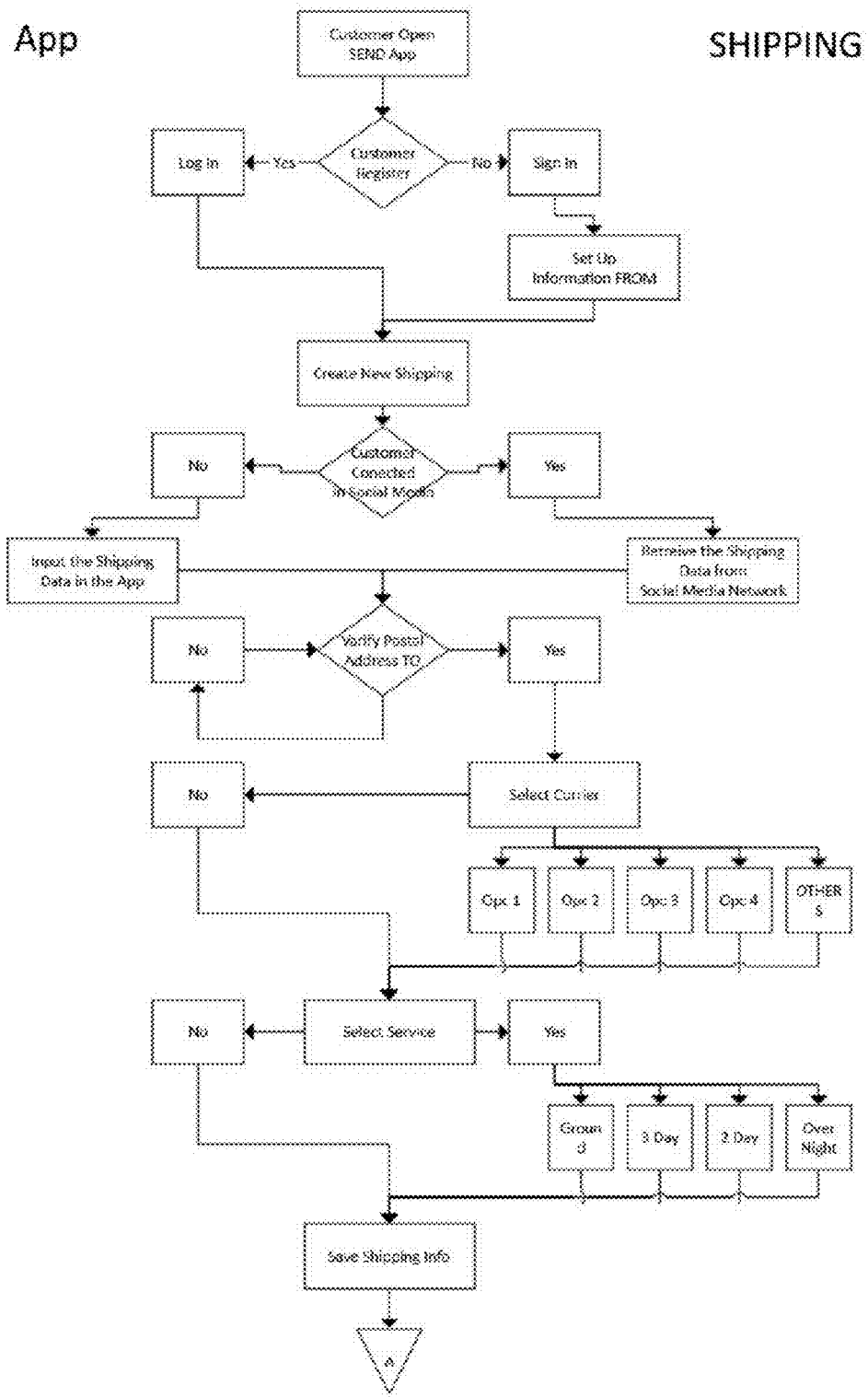
FIGS. 4A and 4B show a flow chart diagram for a method for processing a package for shipping to a recipient.
Figure 4B:
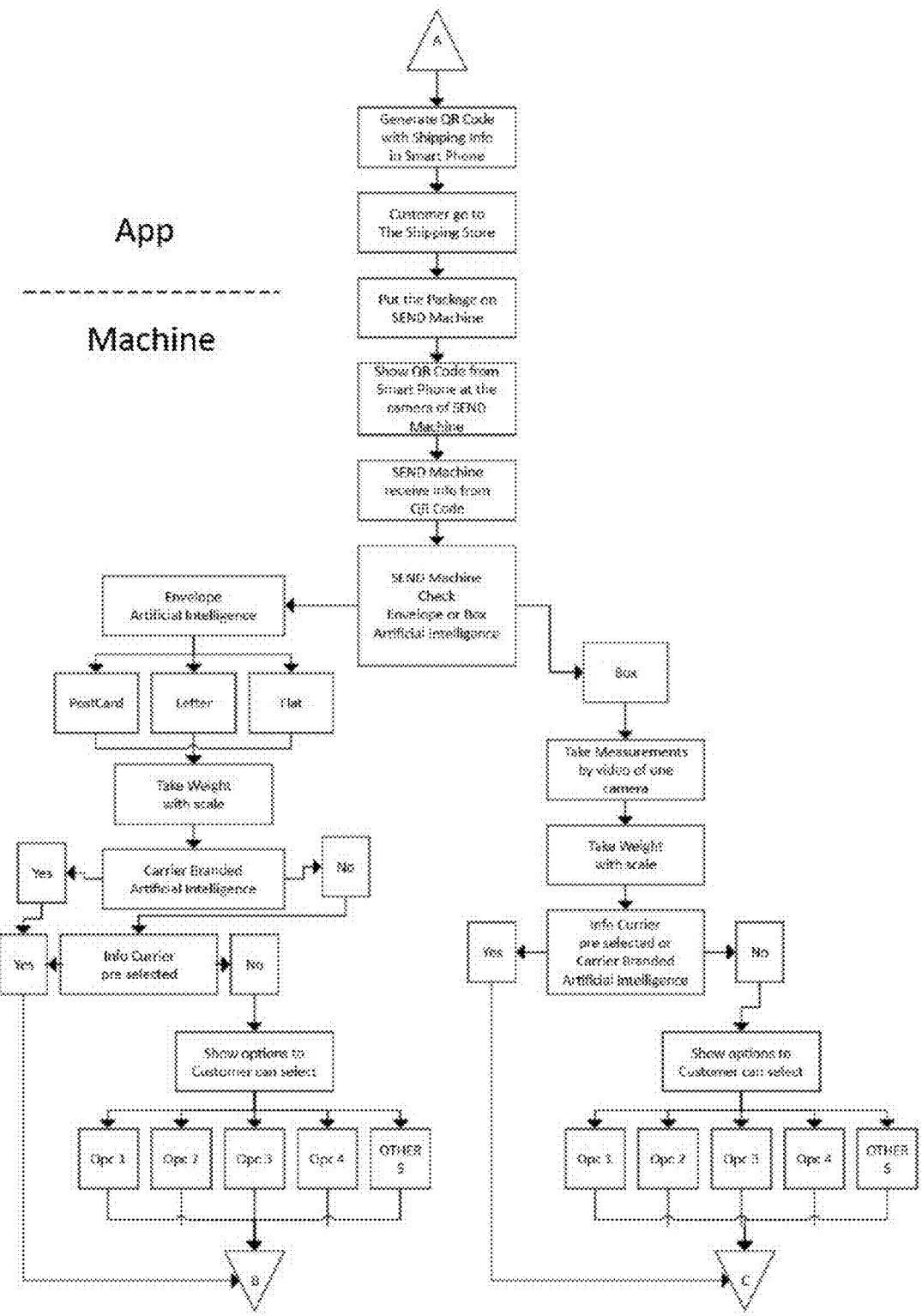
Figure 5A:
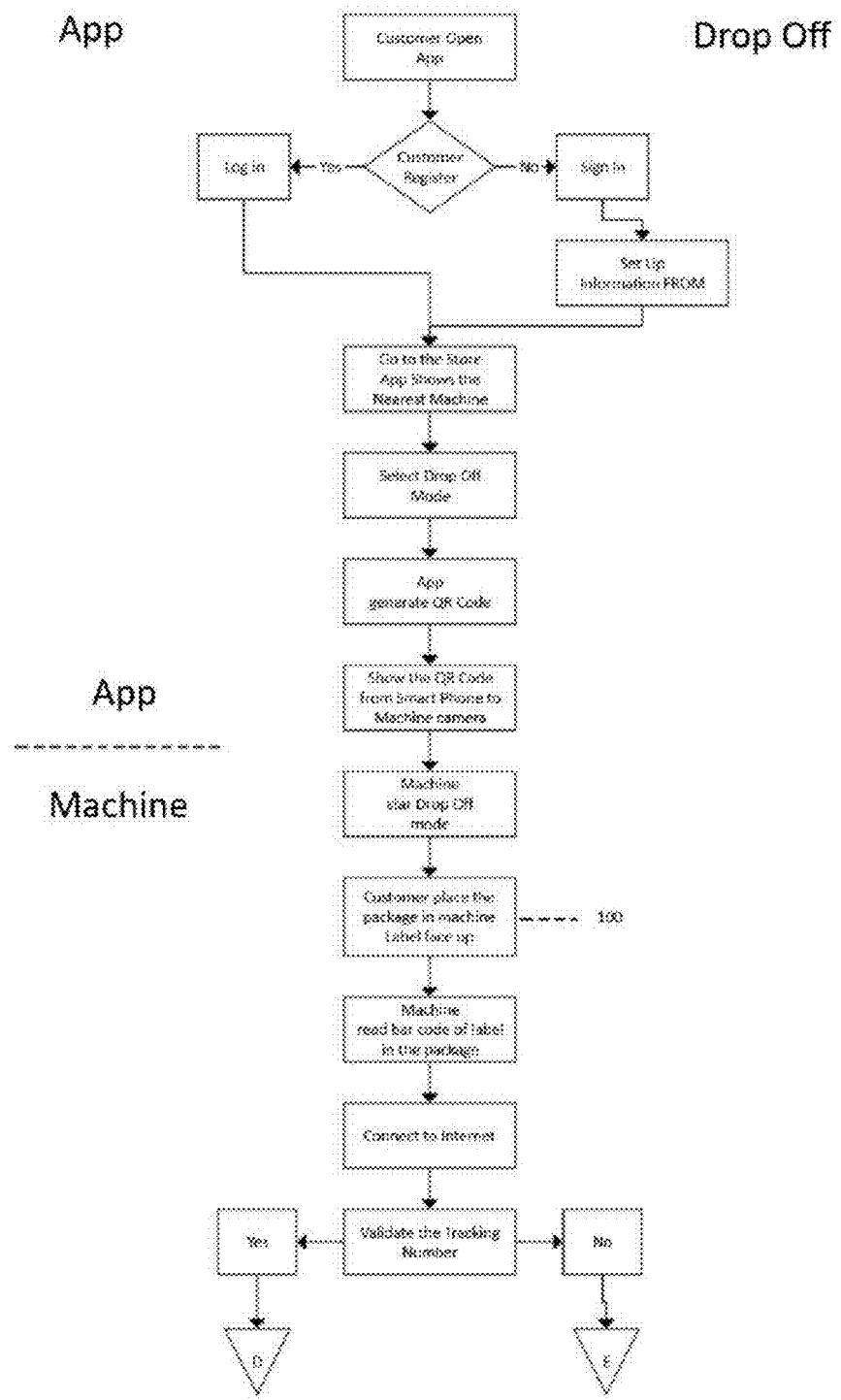
FIGS. 5A and 5B show a flow chart diagram for another method for processing a package for shipping to a recipient.
Figure 5B:
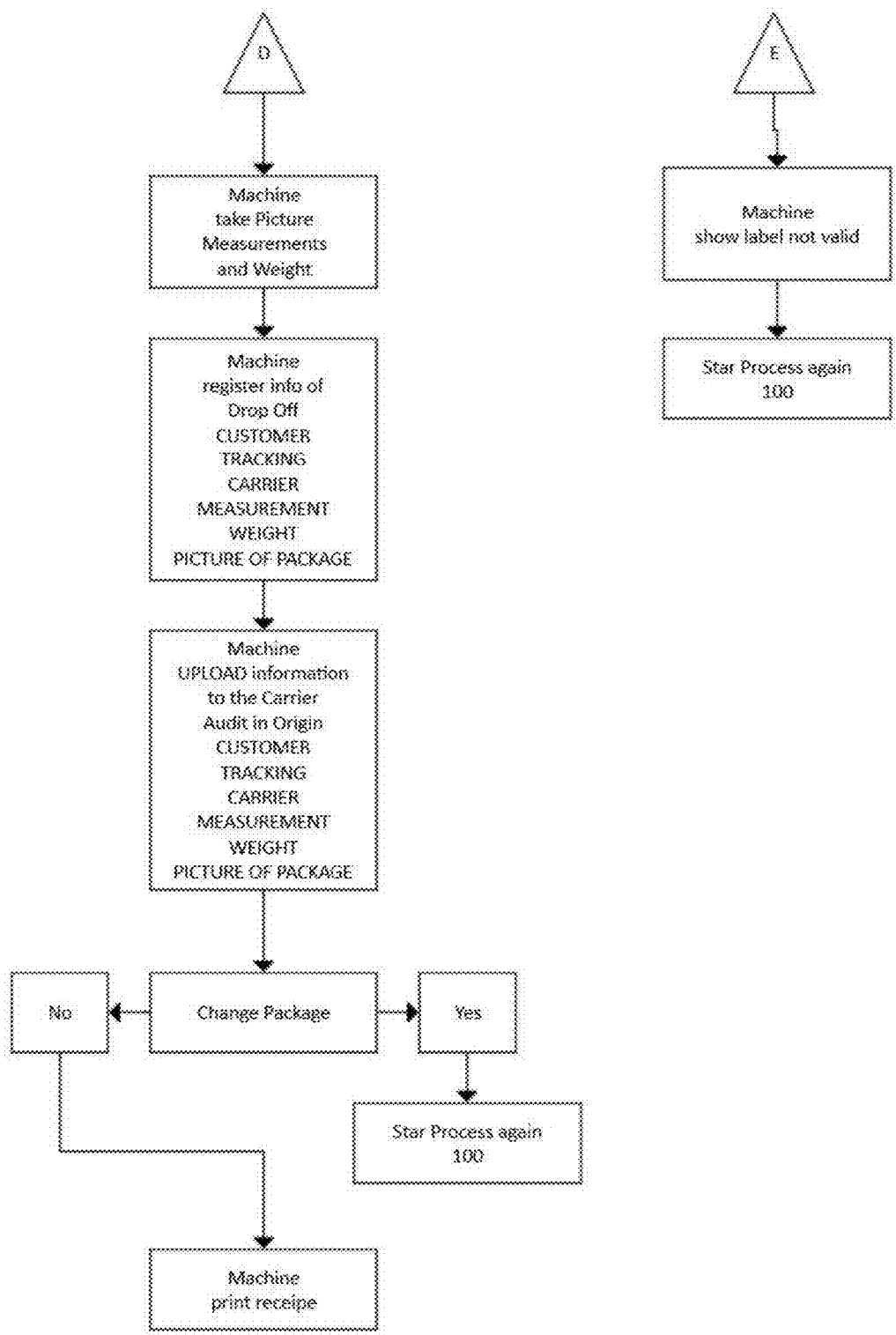
Figure 6:
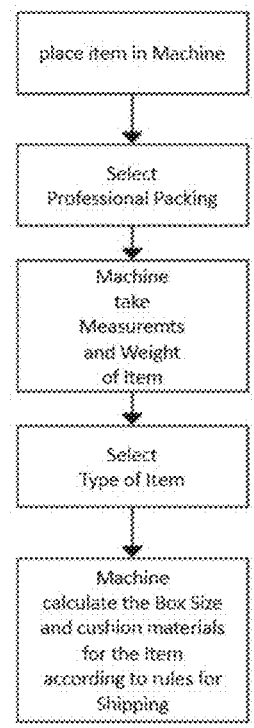
FIG. 6 shows a flow chart diagram of another method for processing a package for shipping to a recipient.
Figure 7:
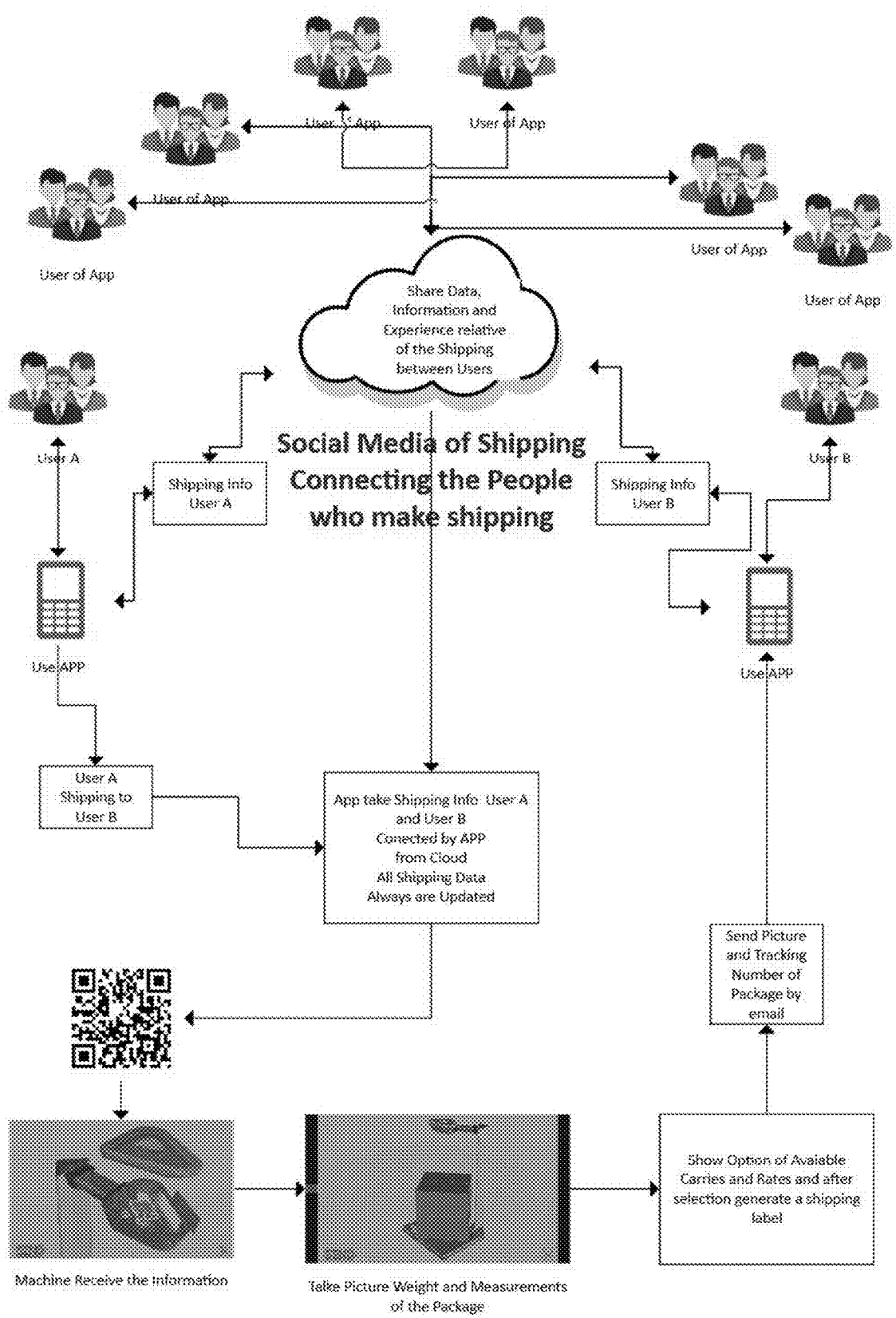
FIG. 7 is a diagram displaying a visual representation of the system and the relationships between its various parts.

The invention provides a device for measuring the dimensions of a package and for accepting payment for shipping of the package. Dimensions can include height, width, and length or depth of package as well as its weight or mass. As shown in FIG. 1, the system can include a package intake device sized and shaped to allow packages of various sizes, shapes, and weights or masses to have their dimensions measured. As shown in FIG. 2, in some embodiments, the package intake device can include a computer and a camera installed within a housing that is suspended above a scale or balance on an arm connected to a vertical member. The vertical member is connected to a base as shown in FIG. 3, or in other embodiments, to a substrate (e.g., to a countertop). The vertical member may be adjustable in height. The arm may be movable for repositioning to accommodate packages of certain shapes and sizes, or the arm may be fixed in position. The computer may include a payment processing application for receiving and processing payment from a user who is sending the package to the recipient.

The invention also features a system for processing a package for shipping to a recipient. The system includes a user device that is a mobile computing device. The user device can feature software for generating a code (e.g. a QR code, other bar code, or other computer readable graphically encoded representation) that encodes recipient information related to a recipient of the package. The user device also includes a display for displaying the code. The user device can be a mobile phone, a tablet computer, a personal digital assistant device, a laptop computer, or any other portable computing device that includes a computer processor and associated memory. The user device can include a recipient information application installed thereon for inputting, editing, and viewing the recipient information of one or more recipients. The application may store the recipient information of the one or more recipients in the memory of the user device.

In other embodiments, the recipient information entered into the recipient information application on the user device may be transmitted to a remote server or remote computer for storage and for later retrieval by the recipient information application when the application is used by the user of the user device. The server can include a database for receiving and storing the recipient information related to each recipient. The recipient information is transmitted to the server by the user device via a communications network. The communications network can be the Internet, a local area network (LAN), a cellular telephone network, or any other suitable network capable of transmitting data between devices.

The recipient information application may be integrated with any of various social media platforms (e.g., Facebook, LinkedIn, Snapchat, Instagram, etc.) so that recipient information for the one or more recipients the user has input into the recipient information application is automatically updated as the recipients update their information in their social media accounts on those social media platforms. If a particular recipient has more than one address or is traveling, the recipient may update his or her location using the social media platform, and the integration module of the recipient information application obtains the recipient's updated location information from the social media platform at which the recipient has an account. Integration of the recipient information application with various social media platforms used by recipients may be automatic, or in other embodiments, may require an opt-in selection or access permission in order for the recipient information application to obtain location information for the recipient from the social media platform. In exemplary embodiments, the recipient information application can itself be a type of social media platform that permits location information sharing between users for package shipping and other purposes. The recipient information application can also serve as an address book on a user device. The recipient information application can require registration and selection of a user name and password for each user to create a user account. A user account may be accessible only on a single user device, on multiple user devices, or on other devices such as computers on which the application is installed or accessed as non-downloadable software via a web browser software application.

The recipient information application installed on the user device includes software that allows the user to connect with other users to make the user's address available to the other users including any updates due to moves or travel. Likewise, the user can also access and view the addresses of the other users, including any updates to addresses the other users may enter into the recipient information applications installed on their own user devices. In addition to addresses, the recipient information application may also contain each user's legal name (or a portion thereof, for example, a first name, a middle name, and/or a surname), a user's nickname or screen name, one or more alternate addresses (e.g., work address or second home address), e-mail address, phone number or numbers, messaging application account handles, and social media account user names or links. In some embodiments, the recipient information application may include communication capabilities that permit the user to send and receive messages to and from other users. For example, the user may send messages to and receive messages from other users in the user's list of contacts within the recipient information application. Such messages may be e-mails, instant messages, SMS messages, MMS messages, or any other type of electronically transmittable message. The messages may include text, photographs, video, other images, or a combination of two or more of the foregoing. The recipient information application may also permit Wi-Fi calls to the user's contacts using the user device. By connecting multiple users and allowing users to easily and quickly edit their current addresses, which are accessible for viewing by each user's contacts, the recipient information application serves as a social media platform for the shipping (or parcel delivery or mail) industry and its customers.

The system also includes a weighing device for determining a weight or mass of a package and a measuring device for determining linear dimensions of the package. The weighing device can be a balance or scales and can be incorporated into the base of the package intake device. In other embodiments, the weighing device can be a separate from but communicatively connected to the package intake device via a wired network or a wireless network.

In exemplary embodiments, the measuring device can be one or more cameras, a laser measuring device, an ultrasound device, or a mechanical measuring device. The one or more cameras can be or include the at least one camera described below, which also can be used to read the code generated by the user device.

In another embodiment, the system can feature a package recognition device that can include the weighing device for determining a weight or mass of the package. The package recognition device can also include the measuring device for determining linear dimensions of the package.

The system further includes at least one camera for detecting the code displayed on the display of the user device. The at least one camera can also be used to determine the linear dimensions of the package. The at least one camera can be a single digital camera, which can be, for example, a CCD sensor with a resolution setting. The at least one camera can use a video operation to generate a digital matrix of an image of the package being processed by the system and can establish a relationship between linear dimension measurements taken in metric or English units and optical referential measurements determined by number of pixels.

To determine the linear dimensions of the package, a parameterized equation is used in which the known mechanical and optical parameters of the camera are used including, for example, the distance between the camera and a reference surface on which the package to be measured is placed. The reference surface is "mechanical zero" meaning that no package is present if the distance measured by the camera and associated software is equal to the predetermined distance between the camera and the reference surface. Among the parameters that the camera can measure are horizontal dispersion angle, vertical dispersion angle, focal length, and camera resolution. A label of known dimensions (in metric or English units) may be affixed to the surface that is determined for mechanical zero. Using the camera and the known parameters of this label allows for the generation of a known matrix of the pixel dimensions of the label. This label may also contain important information about the package intake device (e.g., physical serial number, electronic serial number, and specifications) in a QR fast access code printed on this label. The reference surface may be a top surface of the balance or scales of the weighing device.

To measure a package, when turning on power to the package intake device and knowing the distance between the camera and the reference surface where the reference label is placed (e.g., on an electronic balance for automated weight determination), the system auto-calibrates when converting the physical dimensions of the label into optical dimensions (i.e., pixels) and recognizes the characteristics of each package intake device present in the QR code printed on the label. For clarification, this label is not the shipping label described elsewhere herein.

The package is placed on the package intake device for measuring and weighing, and the code (e.g., a QR code, another bar code, or another graphically encoded computer-readable representation) generated by the recipient information application of the user device is presented for reading by the camera and at least one computer of the package intake device. At this time, the system can print a label with identical physical dimensions to the reference label and with a new QR code with the shipping information including a tracking number of the system itself as well as other security and tracking features. By comparing the different sequential frames of video, the stability of the sample to be measured (i.e., the package) is established and, using mathematical algorithms of open-source computational vision (OPEN CV), the contour of the package and the new size of the label in pixels are determined. Extrapolating with a mathematical equation that involves the parameters named above (among others), the at least one computer's comparison of the two different sizes of labels (in pixels) is used to determine a height of the package and an actual size of the base of the package (i.e., width and length), thereby obtaining the actual dimensions of the package.

Once the linear dimensions and weight or mass of the package have been determined, the system automatically determines a shipping price (e.g., a private shipping price if a private shipping company is to be used to deliver the package or a governmental rate if a postal service is to be used) using as reference the standardized pricing classifications of the different shippers, both governmental and private, if the package is a box or an envelope. If the package is a box, the shipping label may indicate the linear dimensions of length, width, and height as well as the weight or mass of the package for subsequent use in the different pricing processes. The shipping price can also depend upon the shipper selected to deliver the package, the different transport mode options, times of delivery, and conditions thereof for which algorithms provided by different carriers may be used by the system.

If the system determines that the package is an envelope, the system automatically recognizes the shape and size and classifies it as a postcard, a letter, or a flat and according to the graphic and sign characteristics of each one determines which shipper (e.g., postal service or private carrier) has been selected by the user or other party to deliver the package to the recipient. Likewise, the system uses open source computational vision processing for these functions. Using artificial intelligence software, the system is able to recognize a different envelope with dimensional and weight characteristics and add it to its knowledge base to expand the knowledge base related to package type recognition and shipper identification in an organized and structured way.

Once the characteristics of the package have been determined, shipping options are selected, e.g., means of transport, time for delivery and costs of each carrier according to the preferences of the user of the system. The package intake device can feature a standard touch screen to allow the user to select options for which a user selection is required (e.g., carriers, rates, delivery times, etc.) will be presented in a friendly and intuitive way.

Once all the physical characteristics of the package and its administrative characteristics have been determined, the system generates a label with all the data printed on it according to the selections made (carrier, times, tariffs, security features, and tracking). Once the package processing is complete, the system may automatically send an e-mail to the recipient (if the user provided the recipient e-mail address or if it was included in the recipient information application) with all information pertaining to the package and its shipping.

The entire system can be controlled electronically using an open hardware microcomputer managed with an operating system and other codes and software.

The system further includes at least one computer communicatively connected to the mobile computing device.

The at least one computer can include a first computer and a server communicatively connected via a communications network. In exemplary embodiments, the package intake device includes the weighing device, the measuring device, and the at least one camera. The computer features a decoding application for reading the code detected by the camera and converting the code to printable data. The computer also features a package recognition application for determining a type for the package using data obtained from the weighing device, the measuring device, the camera, or a combination of two or more of the foregoing. The computer further includes a courier recognition application for determining an identity of a shipper for the package using data obtained from the weighing device, the measuring device, the camera, or a combination of two or more of the foregoing.

The system can feature one or more of the decoding application, the package recognition application, and the courier recognition application being installed on the server.

The at least one camera can transmit image data related to the package to the at least one computer. The courier recognition application of the at least one computer determines the identity of the shipper selected for delivery of the package based on optical recognition of a color, symbol, word, or logo associated with the shipper and which appears on the package.

The system also features a printer for printing a shipping label. The printer is communicatively connected to the at least one computer and receives the printable data transmitted to the printer from the at least one computer for printing the printable data on the shipping label.

The invention also features a system for processing a package for shipping to a recipient. The system includes a user device and a package intake device. The user device features a transmission device for transmitting recipient information of a recipient selected from a list of one or more recipients displayed on the user device. The package intake device processes a package for shipping, and includes a computer having a processor and associated memory. The package intake device also includes a receiving device for receiving the recipient information transmitted by the user device and a package recognition device for analyzing the package to determine one or more package criteria.

The package recognition device includes a camera communicatively connected to the computer. The computer can include an optical courier recognition application for determining an identity of a shipper for the package using data obtained from the camera.

The one or more package criteria are selected from among: a weight of the package, a mass of the package, a height of the package, a width of the package, a length or depth of the package, a shipper selected for delivering the package to the recipient, and a type of the package. The type of the package can be a box, a letter-sized envelope, an envelope larger than letter-sized, a tube, a post card, or another type of shipping package.

In still another embodiment, the system can feature a user device that can communicatively connect to the computer to permit a user to make a payment, and a communications network that communicatively connects the foregoing parts of the system to one another. The measurement device can be a self-service measurement device for measuring the dimensions of a package such as one that could be located in a shipping location (e.g., in a post office or in a UPS or FedEx store location or in a mail room of an office or office building). The self-service measurement device might also be located in a shipping kiosk (e.g., in a mall, a grocery store, an office building, or a public place), which in some embodiments, may be located next to a mailbox of the postal service or of a shipping courier service.

The measurement device can include rulers for measuring dimensions and scales for measuring weight of the package. In another embodiment, the measurement device can use lasers to measure the dimensions and weight of the package. In another embodiment, the measurement device can use ultrasound to measure the dimensions and weight of the package. In another embodiment, the measurement device can include mechanical and/or automated means for measuring the dimensions and weight of the package.

The computer can be connected to the measurement device, or in some embodiments, the computer can be an integrated component of the measurement device.

The mobile device can be a cellular phone (e.g., a smart phone), a tablet computer, a laptop computer, or any other suitable mobile device that can be easily and conveniently transported by a user.

The system can further include a software application installed on the computing device. For example, the software application can be software (e.g., "an app") installed on a mobile phone. The software application can include data entry fields that permit a user to enter information relevant to a package that is to be shipped. For example, the software application can include data entry fields for entering the name, address, telephone number, e-mail address, or other information of a sender of the package being shipped; the name, address, telephone number, e-mail address, or other information of a recipient of the package being shipped; the dimensions and weight of the package; a desired date of delivery of the package; payment information; and any shipping insurance requests and information. The software application can save this information entered into the data entry fields on the computing device or the information can be stored on a remote server so as to be accessible to the user using the computing device or a different computing device. If the information is stored remotely, the information can be retrieved when desired by, for example, logging into the software application using a unique login and password. The software application may also include an address book module that permits the names, addresses, and other information of recipients to be saved for retrieval and use in shipping additional packages to such recipients at later dates.

The software application can generate a barcode (e.g., a linear code or a two-dimensional matrix code). In an exemplary embodiment, the barcode can be a QR code. The barcode can encode and include the information submitted by the user in the data entry fields of the software application.

For example, in an exemplary embodiment, the user (who can be the sender or another person) can access the software application on the user's mobile phone. (The user can download and install the software application onto the mobile phone, or the software application may be preinstalled on the mobile phone.) The user can enter into appropriate data entry fields of the software application the recipient's name and address as well as the dimensions and weight of the package that is to be shipped to the recipient. Once the information has been entered, a feature of the software application can be activated to generate a barcode that encodes and includes the recipient's name and address and the dimensions and weight of the package. The measurement device can include a barcode scanner that can scan and read the barcode appearing in the software application as displayed on a display screen of the mobile phone so that a shipping label is printed for attachment to the package so that the package may be shipped. The measurement device can include an incorporated printer or the measurement device may be communicatively connected to a separate printer.

The software application may calculate the shipping costs for the package based on the dimensions and weight entered into the data entry fields of the software application by the user. In another embodiment, the software application may transmit the dimensions and weight of the package to a remote computer (e.g., a server) that can calculate the shipping costs for shipping the package to the recipient. In one embodiment, the remote computer may transmit the calculated shipping costs back to the computer device (mobile phone in this example) for inclusion in the barcode. In another embodiment, the remote computer may transmit the shipping costs directly to the measurement device. As a result of the usage of either of the foregoing embodiments, payment of the shipping costs must be completed by the user, and the printer prints a shipping label for attachment to the package being shipped.

In one embodiment, the software application can also calculate or obtain insurance costs related to insuring an item in the package that is to be shipped. This calculation (or obtention) of the insurance costs can be accomplished by means similar to those that would be used to calculate or obtain the shipping costs.

In another embodiment of the system, in addition to or instead of accepting the dimensions and weight for the package that are entered into the data entry fields of the software application, the measurement device may independently measure the package to confirm its dimensions and weight for purposes of calculating the shipping costs so that the user may tender payment.

The software application may include a courier selection feature that allows the user to select a shipper from among one or more courier or shipping companies. This feature can be useful to allow the user to obtain the best rate (i.e., lowest shipping charges) or the best delivery time (i.e., the quickest delivery) for the package.

The system can also include an optional camera that is incorporated in or communicatively attached to the measurement device. The camera can capture a photograph of the package to reduce shipping fraud. The photograph can be compared to the actual photograph at one or more points in the shipping chain to make certain that the package deposited by the user for shipping is the same one (including having an equal weight) that was measured and for which payment of shipping costs were received.

The invention provides methods for processing a package for shipping to a recipient. FIGS. 4A, 4B, 5A, 5B, 6, and 7 illustrate exemplary embodiments of the systems, processes, and methods of the invention. The methods described herein below are capable of being implemented using systems, devices, and software as described elsewhere herein. In one step of the method, a user selects a recipient to receive delivery of a package that the user wishes to send to the recipient. The user makes the selection of the recipient from a list of one or more recipients displayed on a user device of the types described elsewhere herein. In a next step of the method, recipient information related to the selected recipient is transmitted from the user device to a package intake device. The package intake device includes a computer featuring a receiving device. The receiving device receives the recipient information transmitted from the user device. In one exemplary embodiment, the recipient information is transmitted from the user device to the receiving device when the user device encodes the recipient information in a code (e.g., a QR code or other bar code) that is displayed or visually represented on a display of the user device and then scanned, captured, photographed, or otherwise optically read, detected, or recognized by the package intake device either by a camera or a scanner device.

In a next step of the method, the package is analyzed to determine one or more package criteria using a package recognition device. Examples of the one or more package criteria include a weight of the package, a mass of the package, a height of the package, a width of the package, a length or depth of the package, a shipper selected for delivering the package to the recipient, and a type of the package. The type of the package can be, for example, a box, a letter-sized envelope, an envelope larger than letter-sized, a tube, a post card, or another type of shipping package. In some embodiments, the devices used with the method may be programmed to recognize or identify other types of packaging, including irregular package types, as well as packaging materials (e.g., cardboard, paper, wood, metal, etc.).

In a next step of the method, the package is associated with the recipient information of the selected recipient. The association of the recipient information with the package is accomplished, in most embodiments, by printing and affixing a shipping label to the package, which has the recipient information printed thereon. In an exemplary embodiment, this step of the method can include the additional steps of communicating the recipient information to a printer connected to the computer via a wired network or a wireless network and printing a shipping label for the package. The printed shipping label includes the recipient information. In an alternate embodiment of this step of the method, rather than printing the recipient information in characters or alphanumeric text (e.g., the recipient's printed name, address, phone number, or other contact information), the computer of the package intake device may transmit an encoded version of the recipient information to the printer so that the printer prints a label that includes a printed representation of the encoded version of the recipient information, e.g., a bar code or other graphically encoded representation that can be read by a camera or other optical scanning device and decoded by appropriate software. In this latter embodiment, the recipient information may not appear in printed alphanumeric text form on the shipping label. In other embodiments, the computer of the package intake device may transmit to the printer instructions to print on the shipping label the recipient information in both text form and in an encoded code format.

In a final step of the method, initial processing being complete, the package is transferred to a shipper for delivery to the recipient.

In one exemplary embodiment of the method, an identity of a shipper that has been selected by the user or other party to deliver the package to the recipient may be determined by an automatic process based on printed information or other features appearing on an exterior surface of the package. In this exemplary embodiment, image data related to the package is transmitted from at least one camera to the computer. In some embodiments, the package intake device includes the at least one camera while in other embodiments, the at least one camera can be separate from but communicatively connected to the computer of the package intake device. In a next step, an identity of a shipper selected for delivery of the package to the recipient is determined by the computer of the package intake device based on optical recognition of a color, symbol, word, or logo associated with the shipper and which appears on the package. This information is included in the image data for the package that is transmitted by the at least one camera to the computer of the package intake device. The computer features a courier recognition application that performs the optical recognition by analyzing the image data of the package to match the color, symbol, word, or logo on the package with a corresponding color, symbol, word, or logo contained in a shipper database. The shipper database can be stored on the computer or can be stored on a remote server or other computer that is accessed by the computer via a communications network (e.g., the Internet) to retrieve the shipper database information for use in the analysis of the image data.

In another exemplary embodiment of the method, a package type of the package can be determined by an automatic process based on a determination of the dimensions of the package. In this exemplary embodiment, a weighing device determines a weight or mass of the package. A measuring device determines linear dimensions of the package. The package intake device can include the weighing device, the measuring device, or both. Next, a type of the package is determined using a package recognition application. Examples of package types of which the package might be include a box, a letter-sized envelope, an envelope larger than letter-sized, a tube, a post card, an irregular package, or another type of shipping package. The computer includes the package recognition application, and the package recognition application determines the package's type by analyzing package data obtained from the weighing device, the measuring device, the at least one camera, or a combination of two or more of the foregoing. In an exemplary embodiment, the at least one camera obtains the package data, which it transmits to the computer for analysis by the package recognition application. In some alternate embodiments, the at least one camera can be separate from the package intake device and can include a computer that features the package recognition application, thereby allowing the at least one camera to perform the package type determination.

In another next step, a shipping price is determined based on the package type and the identity of the shipper. The pricing information is obtained from a database of shippers and their prices. This database can be stored on the computer or can be accessed on a remote server to which the computer communicatively connects via a wired or wireless communications network in order to retrieve pricing information to make the necessary shipping price determination for the package.

The invention also provides a method for measuring the dimensions of a package and for accepting payment for shipping of the package. The method can make use of a system such as the one described herein above. In one step of the method, a user may enter a recipient's name and address into data entry fields intended for the same in a software application installed on a mobile phone. The user can measure the dimensions and weight of the package that is to be shipped to the recipient. In another step of the method, the user can then enter those dimensions and weight for the package into other data entry fields of the software application. In another step of the method, the software application then generates a barcode that is viewable on a display screen of the mobile phone. In a next step, a measurement device can be used to scan and read the barcode. In a next step, the user makes payment. In one embodiment of the method, the user can make payment using the software application. In another embodiment of the method, the user can make payment using the measurement device, which can include a computer and/or debit and credit card transaction terminal. Once payment has been confirmed, in another step of the method, the system prints a shipping label that includes the recipient name and address that were provided by the user. The shipping label can then be attached to the package and the package can be deposited for shipping and delivery to the recipient.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for processing a package for shipping to a recipient, the system comprising:
   a mobile computing device comprising software for generating a code that encodes recipient information related to a recipient of the package and a display for displaying the code;
   a weighing device for determining a weight or mass of a package;
   a measuring device for determining linear dimensions of the package;
   at least one camera for detecting the code displayed on the display of the mobile computing device;
   at least one computer communicatively connected to the mobile computing device, the weighing device, the measuring device, and the at least one camera, wherein the computer comprises:
     a decoding application for reading the code detected by the camera and converting the code to printable data;
     a package recognition application for determining a type for the package using data obtained from the weighing device, the measuring device, the camera, or a combination of two or more of the foregoing; and
     a courier recognition application for determining an identity of a shipper for the package using data obtained from the weighing device, the measuring device, the camera, or a combination of two or more of the foregoing.

2. The system of claim 1, further comprising a server comprising a database for receiving and storing the recipient information for the recipient, wherein the recipient information is transmitted to the server by the mobile computing device via a communications network.

3. The system of claim 1, further comprising a server comprising a database for receiving and storing the recipient information for the recipient, wherein the recipient information is transmitted to the server by the computer via a communications network.

4. The system of claim 1, wherein the at least one computer comprises a first computer and a server communicatively connected via a communications network.

5. The system of claim 4, wherein one or more of the decoding application, the package recognition application, and the courier recognition application are installed on the server.

6. The system of claim 1, wherein the at least one camera transmits image data related to the package to the at least one computer; wherein the courier recognition application of the at least one computer determines the identity of the shipper selected for delivery of the package based on optical recognition of a color, symbol, word, or logo associated with the shipper and which appears on the package.

7. The system of claim 1, further comprising a printer for printing a shipping label, wherein the printer is communicatively connected to the at least one computer and receives the printable data transmitted to the printer from the at least one computer for printing the printable data on the shipping label.

8. A system for processing a package for shipping to a recipient, the system comprising:
 a mobile user device comprising a transmission device for transmitting recipient information of a recipient selected from a list of one or more recipients displayed on the mobile user device;
 a package intake device for processing a package for shipping, the package intake device comprising:
  a computer comprising a processor and associated memory;
  a receiving device for receiving the recipient information transmitted by the mobile user device; and
  a package recognition device for analyzing the package to determine one or more package criteria.

9. The system of claim 8, wherein the mobile user device comprises a mobile phone, a tablet computer, a personal digital assistant device, a laptop computer, or any other portable computing device.

10. The system of claim 8, wherein the mobile user device comprises a recipient information application for inputting, editing, and viewing the recipient information of the recipient.

11. The system of claim 1, wherein the recipient information inputted into the recipient information application is stored on a database, wherein the database resides on the mobile user device or on a remote server.

12. The system of claim 8, wherein the package recognition device comprises a weighing device for determining a weight or mass of the package.

13. The system of claim 8, wherein the package recognition device comprises a measuring device for determining linear dimensions of the package.

14. The system of claim 8, wherein the package recognition device comprises a camera communicatively connected to the computer; and wherein the computer comprises an optical courier recognition application for determining an identity of a shipper for the package using data obtained from the camera.

15. The system of claim 8, wherein the one or more package criteria comprise: a weight of the package, a mass of the package, a height of the package, a width of the package, a length or depth of the package, a shipper selected for delivering the package to the recipient, and a type of the package, wherein the type of the package comprises a box, a letter-sized envelope, an envelope larger than letter-sized, a tube, a post card, or another type of shipping package.

16. The system of claim 8, further comprising a printer for printing a shipping label, wherein the printer is communicatively connected to the package intake device, which transmits the recipient information to the printer for printing on the shipping label.

17. A method for processing a package for shipping to a recipient, the method comprising the steps of:
 (a) selecting a recipient to receive delivery of a package, wherein the selection of the recipient is made from a list of one or more recipients displayed on a mobile user device;
 (b) transmitting recipient information related to the selected recipient from the mobile user device to a package intake device, wherein the package intake device comprises a computer comprising a receiving device, wherein the receiving device receives the recipient information transmitted from the mobile user device;
 (c) analyzing the package to determine one or more package criteria using a package recognition device;
 (d) associating the package with the recipient information of the selected recipient; and
 (e) transferring the package to a shipper for delivery to the recipient.

18. The method of claim 17, wherein step (d) of the method further comprises the steps of:
 (f) communicating the recipient information to a printer connected to the computer via a wired network or a wireless network; and
 (g) printing a shipping label for the package, wherein the printed shipping label comprises the recipient information.

19. The method of claim 17, wherein step (c) of the method further comprises the steps of:
 (h) transmitting image data related to the package from at least one camera to the computer, wherein the package intake device comprises the at least one camera; and
 (i) determining an identity of the shipper selected for delivery of the package to the recipient based on optical recognition of a color, symbol, word, or logo associated with the shipper and which appears on the package, wherein the computer comprises a courier recognition application, and wherein the optical recognition is performed by the courier recognition application by analyzing the image data of the package to match the color, symbol, word, or logo on the package with a corresponding color, symbol, word, or logo contained in a shipper database.

20. The method of claim 19, further comprising the steps of:
 (j) determining a weight or mass of the package using a weighing device, wherein the package intake device comprises the weighing device;
 (k) determining linear dimensions of the package using a measuring device, wherein the package intake device comprises the measuring device; and
 (l) determining a type of the package using a package recognition application, wherein the computer comprises the package recognition application, and wherein the package recognition application determines the package's type by analyzing package data obtained from the weighing device, the measuring device, the at least one camera, or a combination of two or more of the foregoing; and
 (m) determining a shipping price based on the package type and the identity of the shipper.

* * * * *